(12) United States Patent
Kawai

(10) Patent No.: US 9,242,650 B2
(45) Date of Patent: Jan. 26, 2016

(54) VEHICLE CONTROL APPARATUS

(75) Inventor: Takashi Kawai, Gotemba (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/399,021

(22) PCT Filed: May 9, 2012

(86) PCT No.: PCT/JP2012/061911
§ 371 (c)(1),
(2), (4) Date: Nov. 5, 2014

(87) PCT Pub. No.: WO2013/168249
PCT Pub. Date: Nov. 14, 2013

(65) Prior Publication Data
US 2015/0073672 A1    Mar. 12, 2015

(51) Int. Cl.
| | | |
|---|---|---|
| *B60W 10/02* | (2006.01) | |
| *B60W 10/06* | (2006.01) | |
| *B60W 10/24* | (2006.01) | |
| *B60W 30/188* | (2012.01) | |
| *F16F 15/31* | (2006.01) | |

(52) U.S. Cl.
CPC ............ *B60W 30/188* (2013.01); *B60W 10/02* (2013.01); *B60W 10/06* (2013.01); *F16F 15/31* (2013.01)

(58) Field of Classification Search
None
See application file for complete search history.

(56) References Cited

U.S. PATENT DOCUMENTS

| | | | | |
|---|---|---|---|---|
| 7,677,135 B2* | 3/2010 | Himmelmann | ........ | B60K 6/387 180/65.1 |
| 2006/0112781 A1* | 6/2006 | Kuras | .................... | B60W 10/08 74/661 |
| 2010/0156219 A1* | 6/2010 | Wang | .................. | F16C 32/0465 310/90.5 |

FOREIGN PATENT DOCUMENTS

JP    2006-283955 A    10/2006

* cited by examiner

*Primary Examiner* — Edwin A Young
(74) *Attorney, Agent, or Firm* — Kenyon & Kenyon LLP

(57) ABSTRACT

A control apparatus is applied to a vehicle. The vehicle has an internal combustion engine and a variable inertia flywheel provided on an output shaft of the internal combustion engine. The control apparatus decreases supply current to the electromagnetic coil while controlling the internal combustion engine so that a torque of the internal combustion engine is reduced while maintaining power output from the internal combustion engine, in a case determining that temperature of the electromagnetic coil is higher than a first determination temperature when: the internal combustion engine is being operated; and a main body and a ring member of the variable inertia flywheel are being connected by the current supplied to the electromagnetic coil.

4 Claims, 6 Drawing Sheets

VEHICLE CONTROL APPARATUS

CROSS-REFERENCE TO RELATED APPLICATIONS

This is a national phase application based on the PCT International Patent Application No. PCT/JP2012/061911 filed May 9, 2012, the entire contents of which are incorporated herein by reference.

TECHNICAL FIELD

The present invention relates to a control apparatus to be applied to a vehicle having an internal combustion engine and a variable inertia flywheel being attached to an output shaft of the internal combustion engine and being allowed to change a moment of inertia by magnetic force generated from an electromagnetic coil.

BACKGROUND ART

There is known a variable inertia flywheel being allowed to change a moment of inertia, as a flywheel which is attached to an output shaft of an internal combustion engine. For example, there is known a flywheel apparatus having a wheel and an inertia ring which is provided near the wheel, the wheel and the inertia ring being connected by magnetic force which is generated when a current is supplied to an electromagnetic coil (see Patent Literature 1).

CITATION LIST

Patent Literature

Patent Literature 1: JP 2006-283955 A

SUMMARY OF INVENTION

Technical Problem

As well known, when a current is supplied to an electromagnetic coil, heat is generated in the electromagnetic coil and temperature of the electromagnetic coil increases. Thereby, in the apparatus of the Patent Literature 1, when it is necessary to maintain a connection between the wheel and the inertia ring for a prolonged time, there is a possibility that the temperature of the electromagnetic coil increases excessively. The Patent Literature 1 fails to disclose and teach a method for preventing an excessive increase of the temperature of the electromagnetic coil.

In view of the foregoing, one object of the present invention is to provide a vehicle control apparatus capable of preventing an excessive increase of temperature of the electromagnetic coil of the variable inertia flywheel.

Solution to Problem

A control apparatus of the present invention is applied to a hybrid vehicle, the vehicle having an internal combustion engine and a variable inertia flywheel being provided on an output shaft of the internal combustion engine, the variable inertia flywheel having: a first inertial body which rotates with the output shaft integrally; a second inertial body physically different from the first inertial body; and an electromagnetic coil, and being allowed to change a moment of inertia by connecting the first inertial body and the second inertial body by using electromagnetic force which is generated when a current is supplied to the electromagnetic coil, wherein the control apparatus includes a control device which decreases the current supplied to the electromagnetic coil while controlling the internal combustion engine so that a torque of the internal combustion engine is reduced while power to be output from the internal combustion engine is maintained, in a case that the control device determines that temperature of the electromagnetic coil is higher than a predetermined determination temperature when: the internal combustion engine is being operated; and the first inertial body and the second inertial body are being connected by the current supplied to the electromagnetic coil.

According to the control apparatus of the present invention, since the supply current to the electromagnetic coil is decreased when the temperature of the electromagnetic coil is higher than the determination temperature, it is possible to decrease a quantity of heat generated by the electromagnetic coil. As a result, since it is possible to suppress an increase of the temperature of the electromagnetic coil, it is possible to prevent an excessive increase of the temperature of the electromagnetic coil. Furthermore, since the torque of the internal combustion engine is reduced when the temperature of the electromagnetic coil is higher than the determination temperature, it is possible to maintain a connection between the first inertial body and the second inertial body even though the supply current to the electromagnetic coil is decreased. In this case, the torque is reduced while the power, which is output from the internal combustion engine, is maintained. Thereby, it is possible to prevent decreasing the power of the internal combustion engine when the supply current is decreased.

In one embodiment of the control apparatus of the present invention, the control device may first reduce the torque of the internal combustion engine while maintaining the power output from the internal combustion engine, next may set an amount of decrease of supply current to the electromagnetic coil based on an amount of reduction of the torque of the internal combustion engine, and then may decrease the supply current to the electromagnetic coil by the amount of decrease which has been set, in a case that the control device determines that the temperature of the electromagnetic coil is higher than the determination temperature when: the internal combustion engine is being operated; and the first inertial body and the second inertial body are being connected by the current supplied to the electromagnetic coil. According to this embodiment, since the amount of decrease of the supply current is set based on the amount of reduction of the torque, it is possible to set the amount of decrease capable of maintaining the connection between the first inertial body and the second inertial body certainly. Furthermore, by setting the amount of decrease in this manner, it is possible to set the amount of decrease that the supply current reaches a minimum current value which maintains the connection between the first inertial body and the second inertial body.

In one embodiment of the control apparatus of the present invention, an upper limit determination temperature which is higher than the determination temperature may be set, and the control device may include a coil protection device which: sets the amount of decrease of the supply current to the electromagnetic coil based on the temperature of the electromagnetic coil; and then decreases the supply current to the electromagnetic coil by the amount of decrease which has been set, when the coil protection device determines that the temperature of the electromagnetic coil is higher than the upper limit determination temperature. According to this embodiment, when the temperature of the electromagnetic coil is higher than the upper limit determination temperature, the supply current to the electromagnetic coil is decreased with no reduction of the torque of the internal combustion engine. Thereby, it is possible to prevent the excessive increase of the temperature of the electromagnetic coil certainly. Furthermore, since the amount of decrease of the supply current in this case is set based on the temperature of the electromagnetic coil, it is possible to set the amount of decrease capable of decreasing the temperature of the electromagnetic coil.

In this embodiment, the coil protection device may make larger the amount of decrease of the supply current to the electromagnetic coil as the temperature of the electromagnetic coil increases. By setting the amount of decrease in this manner, it is possible to decrease the temperature of the electromagnetic coil certainly.

DESCRIPTION OF EMBODIMENTS

Figure 1:
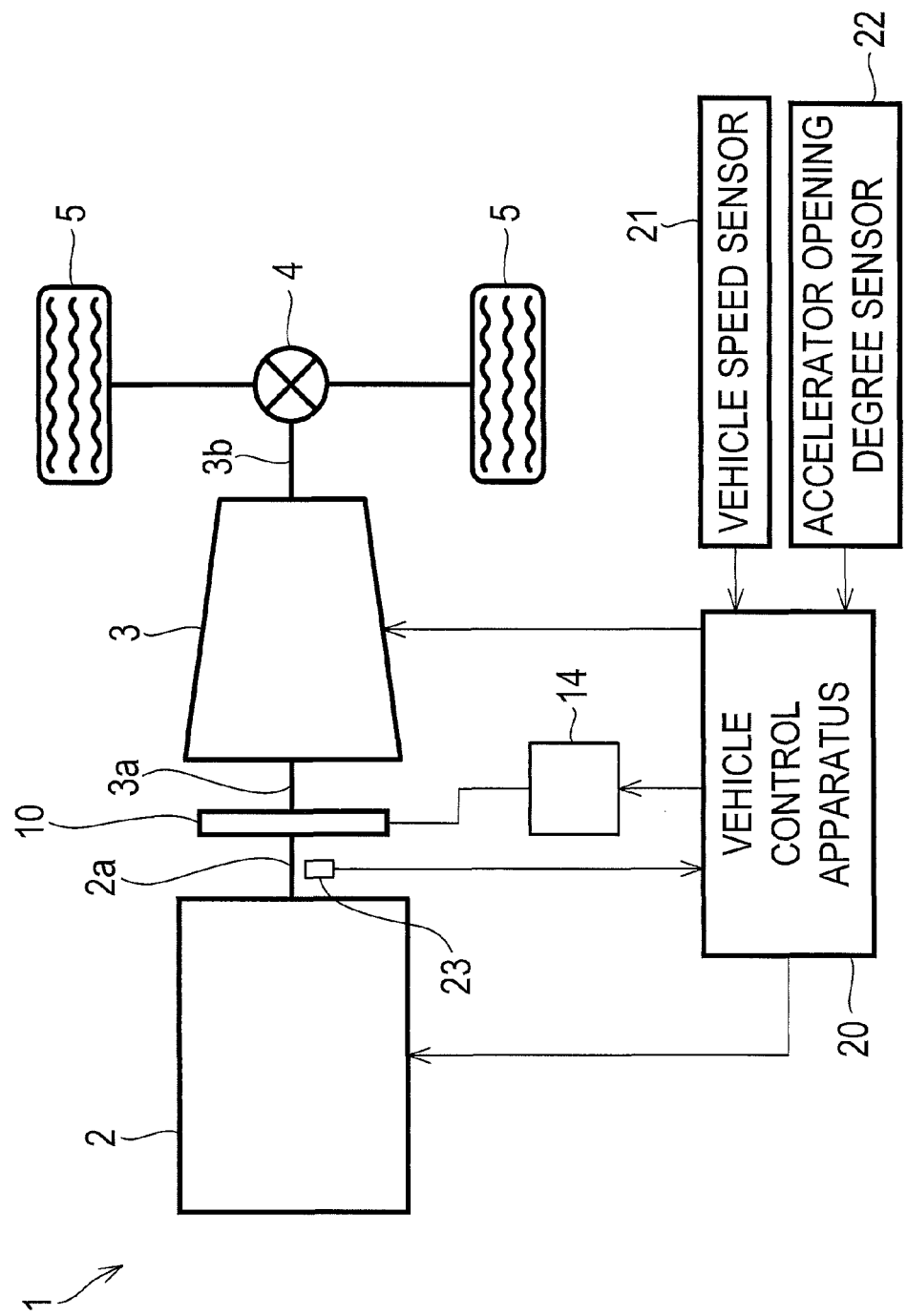
FIG. 1 is a schematic diagram showing main portions of a vehicle where a control apparatus according to one embodiment of the present invention is incorporated.

FIG. 1 schematically shows main portions of a vehicle where a control apparatus according to one embodiment of the present invention is incorporated. On the vehicle 1, an internal combustion engine (hereinafter, referred to as an engine) is mounted as a driving source for traveling. The engine 2 is a well known spark ignition type internal combustion engine having plural cylinders. An output shaft 2a of the engine 2 is connected with an input shaft 3a of a transmission 3. The transmission 3 is a well known belt type continuously variable transmission being allowed to change gear ratios between the input shaft 3a and an output shaft 3b steplessly. The output shaft 3b of the transmission 3 is connected with a differential mechanism 4. The differential mechanism 4 is a well known mechanism which distributes inputted power to the right and left drive wheels 5.

Figure 2:
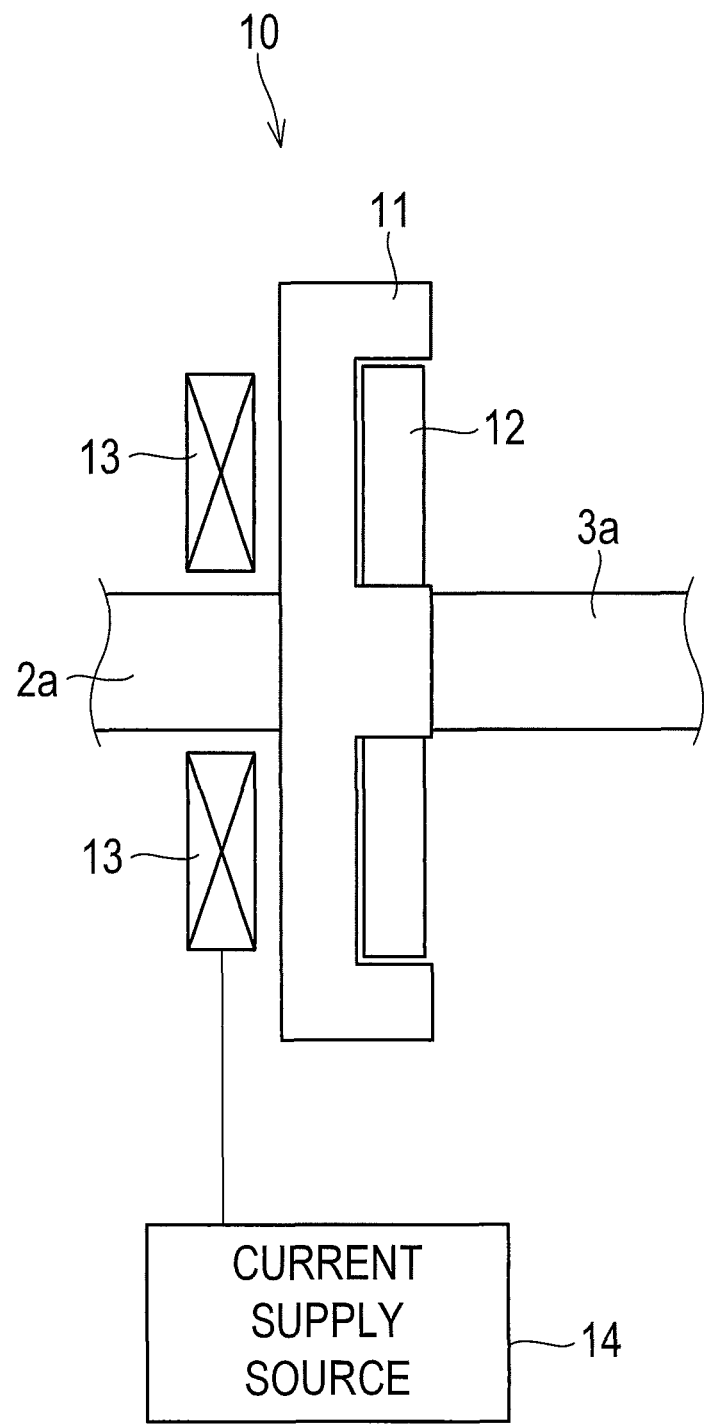
FIG. 2 is a schematic diagram showing a flywheel.

The output shaft 2a of the engine 2 is provided with a variable inertia flywheel (hereinafter, referred to as a flywheel) 10 being allowed to change a moment of inertia. FIG. 2 schematically shows a cross sectional view of the flywheel 10. As shown in this figure, the flywheel 10 has a main body 11 as a first inertial body, a ring member 12 as a second inertial body, and an electromagnetic coil 13 which generates magnetic force when a current is applied to the electromagnetic coil 13. The main body 11 is attached on the output shaft 2a so as to rotate integrally with the output shaft 2a. The main body 11 is composed of material which allows a magnetic flux to pass freely therein. The ring member 12 is composed of magnetic material. The ring member 12 is provided so as to be rotatable relatively to the main body 11. Furthermore, the ring member 12 is provided so as to be movable in a rotational axis direction, that is a horizontal direction in this figure. As shown in this figure, the electromagnetic coil 13 is provided at an opposite side of the ring member 12 across the main body 11. The electromagnetic coil 13 is provided away from the main body 11 so as not to contact to the main body 11. Furthermore, the electromagnetic coil 13 is fixed on a vehicle body (not shown) of the vehicle 1 so as not to rotate. The electromagnetic coil 13 is connected with a current supply source 14. The current supply source 14 is configured so as to adjust an amount of the current to be supplied to the electromagnetic coil 13.

In the flywheel 10, when the main body 11 and the ring member 12 are connected with each other, the moment of inertia increases. For connecting the main body 11 and the ring member 12 with each other, current is supplied to the electromagnetic coil 13. As a result, the electromagnetic coil 13 generates a magnetic force. The magnetic force passes through the main body 11 and draws the ring member 12 to the main body 11 side. As a result, the main body 11 and the ring member 12 are connected with each other. And, the main body 11 and the ring member 12 rotate integrally. Hereinafter, this state is referred to as a connection state. On the other hand, when the current supply to the electromagnetic coil 13 is stopped, the magnetic force is not generated. In this case, the connection between the main body 11 and the ring member 12 is released. Thereby, the main body 11 and the ring member 12 rotate separately from each other. In this case, the moment of inertia of the flywheel 10 decreases as compared with the connection state. Hereinafter, this state is referred to as a release state.

The engine 2, the transmission 3, and the flywheel 10 are controlled by a vehicle control apparatus 20. The vehicle control apparatus 20 is configured as a computer unit including a microprocessor and peripheral devices, such as a RAM and a ROM, which are necessary for the operations of the microprocessor. The vehicle control apparatus 20 holds various control programs for making the vehicle 1 travel appropriately. The vehicle control apparatus 20 controls control objects such as the engine 2 and the transmission 3 by executing these programs. The vehicle control apparatus 20 controls the flywheel 10 by controlling the current supply source 14. The vehicle control apparatus 20 is connected with various sensors for obtaining information with respect to the vehicle 1. The vehicle control apparatus 20 is connected with a vehicle speed sensor 21, an accelerator opening degree sensor 22, a crank angle sensor 23, and so on, for example. The vehicle speed sensor 21 outputs a signal corresponding to a speed of the vehicle 1 (vehicle speed). The accelerator opening degree sensor 22 outputs a signal corresponding to an operation amount to the accelerator pedal, that is, an accelerator opening degree. The crank angle sensor 23 outputs a signal corresponding to a rotating speed (the number of revolutions) of the output shaft 2a of the engine 2. In addition, various sensors are further connected to the vehicle control apparatus 20, but they are omitted in the figure.

The vehicle control apparatus 20 controls the flywheel 10 depending on a traveling state of the vehicle 1 and so on. For example, the vehicle control apparatus 20 switches the state of the flywheel 10 to the release state, when the vehicle 1 is accelerated. On the other hand, the vehicle control apparatus 20 switches the state of the flywheel 10 to the connection state, when the vehicle 1 travels at high speed. In addition, the vehicle control apparatus 20 switches the state of the flywheel 10 depending on the traveling state of the vehicle 1 appropriately. The control method of the flywheel is the same as a well-known control method. Thereby, a detailed description of the control method will be omitted.

Furthermore, the vehicle control apparatus 20 adjusts an amount of current which is supplied to the electromagnetic coil 13 according to the temperature of the electromagnetic coil 13, when the flywheel 10 is in the connection state. When the temperature Tc of the electromagnetic coil 13 is lower than or equal to a predetermined first determination temperature T1, the vehicle control apparatus 20 supplies a predetermined fully connection current value of current to the electromagnetic coil 13. The fully connection current value is set to a current value that the electromagnetic coil 13 generates magnetic force that makes the main body 11 and the ring member 12 rotate integrally even though the engine 2 is operated at a maximum torque. Also when the state of the flywheel 10 is switched to the connection state from the release state, the fully connection current value of current is supplied to the electromagnetic coil 13.

Figure 3:
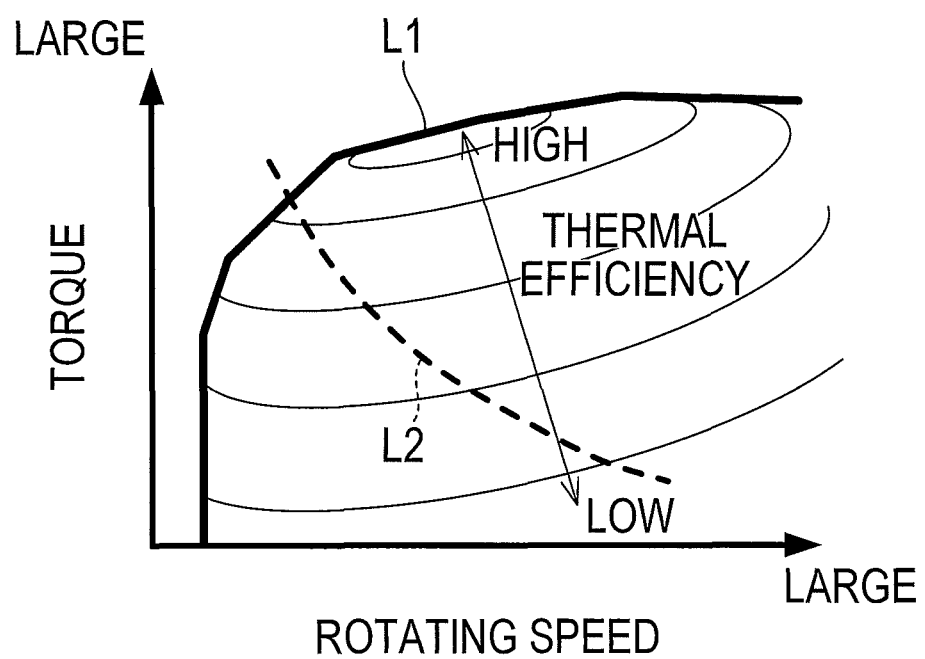
FIG. 3 is a diagram showing relation between an operating point of the internal combustion engine and a thermal efficiency of the internal combustion engine.

On the other hand, when the vehicle control apparatus 20 determines that the temperature Tc of the electromagnetic coil 13 is higher than the first determination temperature T1, the vehicle control apparatus 20 decreases the amount of current which is supplied to the electromagnetic coil 13. The first determination temperature T1 is set as a criterion for determining whether or not it is necessary to make the amount of supply current to the electromagnetic coil 13 lower than the fully connection current value. The first determination temperature T1 may be set appropriately based on a heat resistant temperature of the electromagnetic coil 13 and so on, for example. As well known, a quantity of heat generated by the electromagnetic coil 13 is changed according to the amount of current which is supplied to the electromagnetic coil 13. So, the supply current is decreased in this manner, and thereby, the quantity of heat generated by the electromagnetic coil 13 decreases. Furthermore, as well known, when the supply current to the electromagnetic coil 13 decreases, the magnetic force which is generated by the electromagnetic coil 13 decreases. So, the vehicle control apparatus 20 first reduces the torque of the engine 2, and then decreases the supply current to the electromagnetic coil 13 according to the torque which has been reduced. In this case, the vehicle control apparatus 20 increases the rotating speed of the engine 2 while reducing the torque of the engine 2, so that an output power of the engine 2 is maintained. FIG. 3 shows relation between an operating point of the engine 2 which is specified by the rotating speed and the torque of the engine 2 and a thermal efficiency of the engine 2. A solid line L1 in this figure shows a line connecting operating points each of which is a point where a fuel consumption of the engine 2 reaches minimum at each power when the power of the engine 2 is changed, that is, each of which is a point where the thermal efficiency of the engine 2 reaches maximum. A broken line L2 shows an operating line of the engine 2 in a case that the torque of the engine 2 is changed while the power of the engine 2 is maintained constantly. When the vehicle control apparatus 20 reduces the torque of the engine 2, the vehicle control apparatus 20 controls the engine 2 so that the operating point of the engine 2 moves on the broken line L2. As a result, the power of the engine 2 is maintained.

Furthermore, when the temperature Tc of the electromagnetic coil 13 does not decrease even though the supply current to the electromagnetic coil 13 is decreased, the vehicle control apparatus 20 further decreases the supply current to the electromagnetic coil 13. Specifically, the vehicle control apparatus 20 decreases the supply current to the electromagnetic coil 13 according to the temperature Tc of the electromagnetic coil 13 regardless of the torque of the engine 2, when the temperature Tc of the electromagnetic coil 13 is higher than a predetermined second determination temperature T2. The second determination temperature T2 is set to a temperature which is higher than the first determination temperature T1. The second determination temperature T2 may be also set appropriately depending on the heat resistant temperature of the electromagnetic coil 13 and so on, for example, as with the first determination temperature T1.

Figure 4:
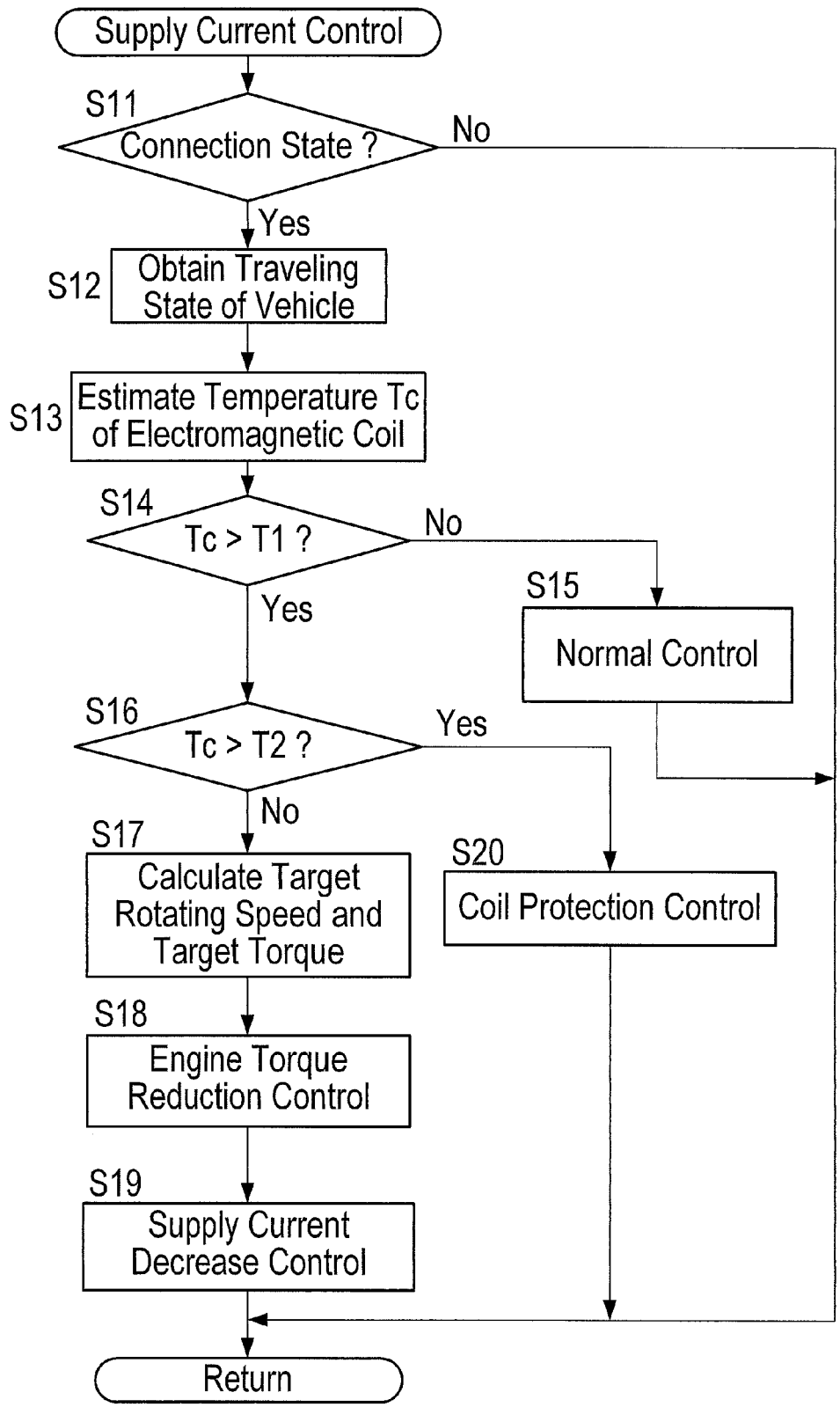
FIG. 4 is a flowchart showing a supply current control routine executed by a vehicle control apparatus.

FIG. 4 shows a supply current control routine where the vehicle control apparatus 20 executes for adjusting the supply current to the electromagnetic coil 13 in this manner. The vehicle control apparatus 20 repeatedly executes this control routine at predetermined intervals while the vehicle 1 is traveling.

In the control routine, the vehicle control apparatus 20 first determines whether or not the flywheel 10 is in the connection state in step S11. When the vehicle control apparatus 20 determines that the flywheel 10 is in the release state, the vehicle control apparatus 20 ends the present control routine. On the other hand, the vehicle control apparatus 20 determines that the flywheel 10 is in the connection state, the vehicle control apparatus 20 goes to step S12 and obtains a traveling state of the vehicle 1. The vehicle control apparatus 20 obtains the vehicle speed, the accelerator opening degree, the rotating speed of the engine 2 and so on as the traveling state of the vehicle 1. Furthermore, in this process, the vehicle control apparatus 20 calculates the torque of the engine 2 and power required by a driver to the engine 2. The torque of the engine 2 may be calculated by a well known method based on the accelerator opening degree. Furthermore, the power of the engine 2 may be calculated by multiplying the rotating speed of the engine 2 by the torque of the engine 2. Accordingly, detailed descriptions of these calculation methods will be omitted. In the next step S13, the vehicle control apparatus 20 estimates the temperature Tc of the electromagnetic coil 13. As described above, the quantity of heat generated by the electromagnetic coil 13 is determined according to the amount of the supply current to the electromagnetic coil 13. And, the temperature of the electromagnetic coil 13 correlates with an integrated value of the quantity of heat. Accordingly, the temperature of the electromagnetic coil 13 may be estimated based on an integrated value of the amount of current supplied to the electromagnetic coil 13, for example.

In the next step S14, the vehicle control apparatus 20 determines whether or not the temperature Tc of the electromagnetic coil 13 is higher than the first determination temperature T1. When the vehicle control apparatus 20 determines that the temperature Tc of the electromagnetic coil 13 is lower than or equal to the first determination temperature T1, the vehicle control apparatus 20 goes to step S15 and executes a normal control. In the normal control, the current supply source 14 is controlled so that the fully connection current value of current is supplied to the electromagnetic coil 13. Thereafter, the vehicle control apparatus 20 ends the present control routine.

Figure 5:
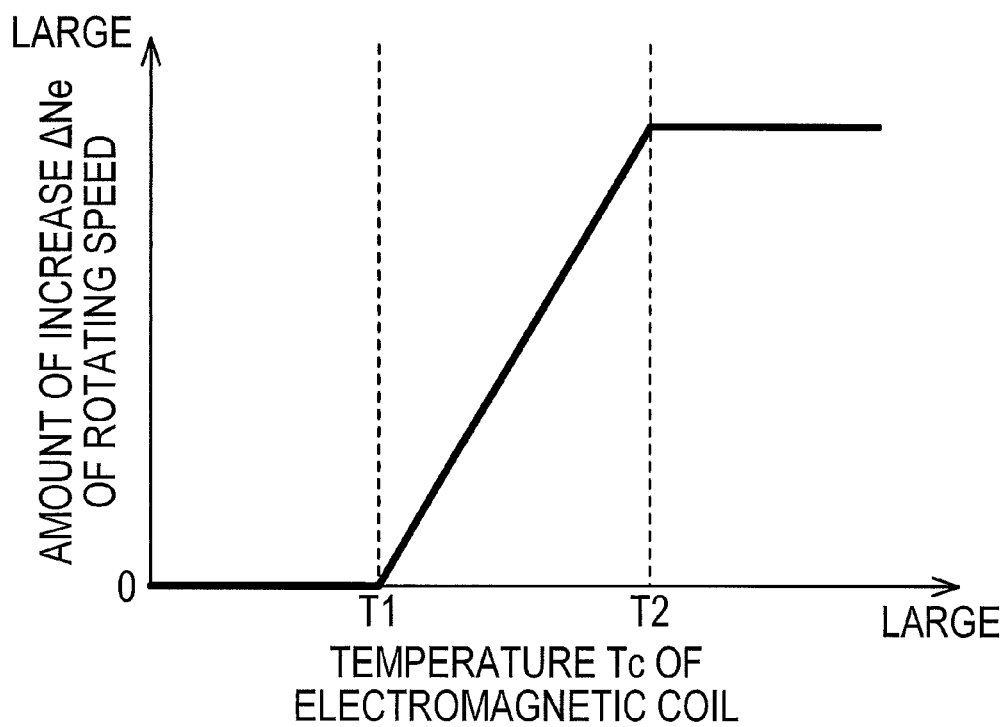
FIG. 5 is a diagram showing an example of relation between a temperature of the electromagnetic coil and an amount of increase of a rotating speed of the internal combustion engine.

On the other hand, the vehicle control apparatus 20 determines that the temperature Tc of the electromagnetic coil 13 is higher than the first determination temperature T1, the vehicle control apparatus 20 goes to step S16 and determines whether or not the temperature of the electromagnetic coil 13 is higher than the second determination temperature T2. When the vehicle control apparatus 20 determines that the temperature of the electromagnetic coil 13 is lower than or equal to the second determination temperature T2, the vehicle control apparatus 20 goes to step S17 and calculates a target rotating speed Ntag and a target torque Ttag of the engine 2. FIG. 5 shows an example of relation between the temperature Tc of the electromagnetic coil 13 and an amount of increase ΔNe of the rotating speed of the engine 2. The relation shown in this figure may be obtained in advance through experiments, numerical calculations, or the like, and stored as a map in the ROM of the vehicle control apparatus 20. And, the amount of increase ΔNe of the rotating speed of the engine 2 may be calculated based on the map. The target rotating speed Ntag is set to a value which is obtained by adding the present rotating speed of the engine 2 to the amount of increase ΔNe of the rotating speed. The target torque Ttag is calculated based on the target rotating speed Ntag calculated. As described above, for reducing the torque of the engine 2, the vehicle control apparatus 20 reduces the torque while maintaining the power of the engine 2 constantly. And, the torque is a value which is obtained by multiplying the rotating speed of the engine 2 by the torque of the engine 2. Accordingly, the target torque Ttag is calculated by dividing the present power of the engine 2 by the target rotating speed Ntag calculated. A difference between the present torque and the target torque Ttag, that is, an amount of reduction ΔT of the torque is indicated by the following equation (1). In the following equation (1), "Pe" indicates the power of the engine 2, and "Ne" indicates the present rotating speed of the engine 2. Furthermore, "T" indicates the present torque. And, the amount of reduction ΔT of the torque which is calculated by the equation (1) is a negative value.

$$\Delta T = Pe/(Ne+\Delta Ne) - T \qquad (1)$$

Figure 6:
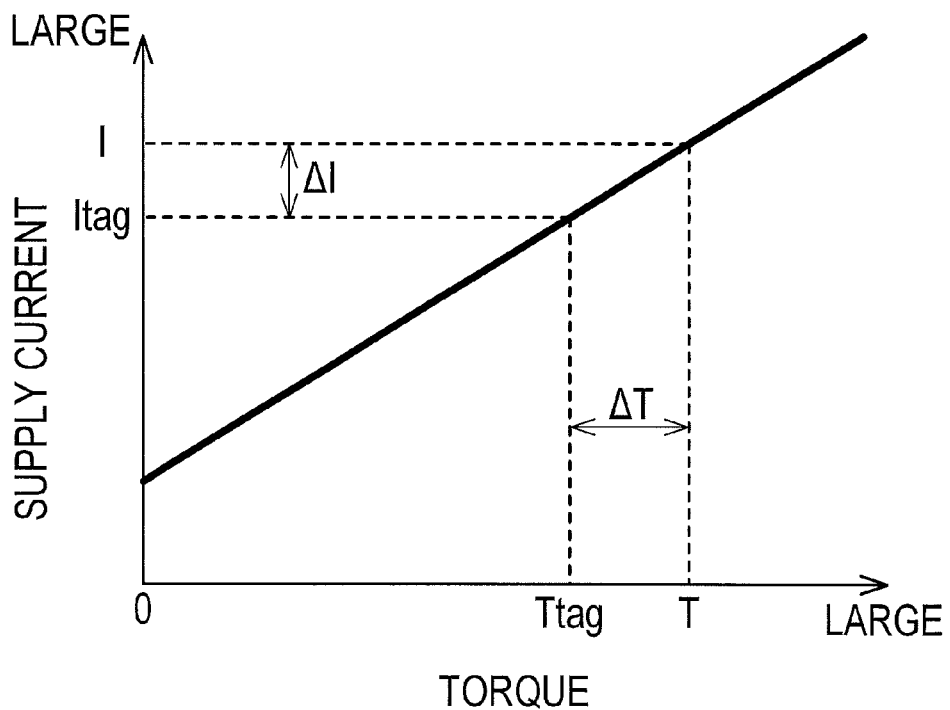
FIG. 6 is a diagram showing an example of relation between a torque of the internal combustion engine and a supply current to the electromagnetic coil.

In the next step S18, the vehicle control apparatus 20 executes an engine torque reduction control. In this control, the engine 2 is controlled so as to be operated at the calculated target rotating speed Ntag and the calculated target torque Ttag. Furthermore, in this control, the transmission 3 is controlled so that the vehicle speed is maintained even though the rotating speed of the engine 2 is changed. Specifically, the transmission 3 is controlled so that the gear ratio is made bigger as the rotating speed of the engine 2 increases. In the next step S19, the vehicle control apparatus 20 executes a supply current decrease control. In this control, first a target current value Itag is calculated based on the target torque Ttag. The target current value Itag is calculated in reference to a map shown in FIG. 6. FIG. 6 shows an example of relation between the torque of the engine 2 and the supply current to the electromagnetic coil 13. "T" in the figure indicates the present torque of the engine 2, and "I" indicates the present amount of the supply current to the electromagnetic coil 13. Furthermore, "ΔT" indicates the amount of reduction of the torque, and "ΔI" indicates an amount of decrease of the supply current. As shown apparently in this figure, when the target torque Ttag is determined, it is possible to calculate the target current value Itag based on the target torque Ttag. The relation shown in FIG. 6 may be obtained in advance through experiments, numerical calculations, or the like, and stored as a map in the ROM of the vehicle control apparatus 20. After calculation of the target current value Itag, the current supply source 14 is controlled so that the amount of the supply current to the electromagnetic coil 13 becomes the target current value Itag. Thereafter, the vehicle control apparatus 20 ends the present control routine.

Figure 7:
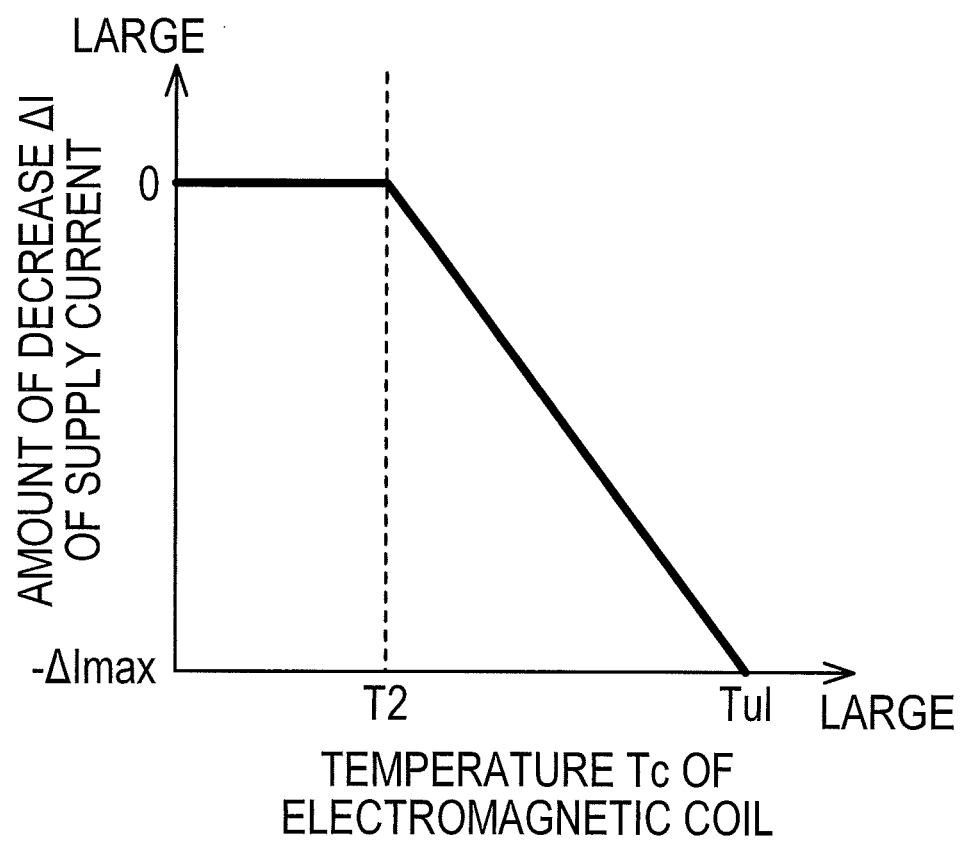
FIG. 7 is a diagram showing an example of relation between a temperature of the electromagnetic coil and an amount of decrease of the supply current.

On the other hand, when the vehicle control apparatus 20 determines that the temperature of the electromagnetic coil 13 is higher than the second determination temperature T2, the vehicle control apparatus 20 goes to step S20 and executes a coil protection control. In this control, first the amount of decrease ΔI of the supply current is calculated based on the temperature of the electromagnetic coil 13. The amount of decrease ΔI of the supply current is calculated in reference to a map shown in FIG. 7. FIG. 7 shows an example of relation between the temperature Tc of the electromagnetic coil 13 and the amount of decrease ΔI of the supply current. As shown in this figure, when the temperature Tc of the electromagnetic coil 13 is lower than or equal to the second determination temperature T2, the amount of decrease ΔI is set to 0. On the other hand, when the temperature Tc of the electromagnetic coil 13 is higher than the second determination temperature T2, the amount of decrease ΔI is set to a value which is smaller than 0, that is, a negative value. And, the amount of decrease ΔI gets smaller as a difference between the temperature Tc of the electromagnetic coil 13 and the second determination temperature T2 increases. "−ΔImax" in this figure is set to a same value as the fully connection current value. Accordingly, when the temperature Tc of the electromagnetic coil 13 is higher than or equal to an upper limit temperature Tul indicated in this figure, the supply of current to the electromagnetic coil 13 is stopped. The relation shown in FIG. 7 may be obtained in advance through experiments, numerical calculations, or the like, and stored as a map in the ROM of the vehicle control apparatus 20. After the calculation of the amount of decrease the current supply source 14 is controlled so that the supply current to the electromagnetic coil 13 decreases by the amount of decrease ΔI calculated. Thereafter, the vehicle control apparatus 20 ends the present control routine.

As described above, in the present invention, since the supply current to the electromagnetic coil 13 is decreases when the temperature Tc of the electromagnetic coil 13 is higher than the first determination temperature Tc, it is possible to decrease the quantity of heat generated by the electromagnetic coil 13. Thereby, it is possible to prevent an excessive increase of the temperature Tc of the electromagnetic coil 13. Furthermore, when the temperature Tc of the electromagnetic coil 13 is between the first determination temperature T1 and the second determination temperature T2, first the torque of the engine 2 is reduced, and then the supply current to the electromagnetic coil 13 is decreased according to the amount of reduction ΔT of the torque. Thereby, even though the magnetic force generated by the electromagnetic coil 13 is decreased because of the decrease of the supply current, it is possible to prevent a separation of the ring member 12 from the main body 11. Accordingly, it is possible to decrease the supply current to the electromagnetic coil 13 while maintaining the flywheel 10 in the connection state. Furthermore, for reducing the torque of the engine 2, the vehicle control apparatus 20 maintains the power of the engine 2 constantly by increasing the rotating speed. Thereby, it is possible to prevent a shortage of power of the engine 2 which is caused by the reduction of the torque of the engine 2. In addition, since the transmission 3 is controlled so that the vehicle speed is maintained even though the rotating speed of the engine 2 is changed, it is possible to prevent providing a feeling of strangeness to the driver.

Furthermore, in the present invention, when the temperature Tc of the electromagnetic coil 13 is higher than the second determination temperature T2, the supply current is decreased according to the temperature Tc of the electromagnetic coil 13. Thereby, it is possible to prevent excessive increase of the temperature Tc of the electromagnetic coil 13 certainly. As a result, it is possible to prevent a burnout of the electromagnetic coil 13.

The amount of decrease of the supply current in the supply current decrease control may not be set based on the amount of reduction of the torque. For example, the amount of decrease of the supply current in the supply current decrease control may be a constant value. In this case, the amount of decrease may be set appropriately so that the flywheel 10 is maintained in the connection state even though the supply current is decreased by the amount of decrease.

By executing the steps S14 and S16-S19 in FIG. 4, the vehicle control apparatus 20 functions as a control device of the present invention. Furthermore, by executing the steps S16 and S20 in FIG. 4, the vehicle control apparatus 20 functions as a coil protection device of the present invention. And, the first determination temperature corresponds to a determination temperature of the present invention, the second determination temperature corresponds to an upper limit determination temperature of the present invention.

The present invention is not limited to the above-described embodiments, and various modifications of the present invention may be provided. For example, the internal combustion engine of the vehicle to which the present invention is applied is not limited to the spark ignition type internal combustion engine. The internal combustion engine may be a diesel engine. Furthermore, the transmission of the vehicle to which the present invention is applied is not limited to the belt type continuously variable transmission. As the transmission, various continuously variable transmissions, for example, a toroidal type continuously variable transmission and so on may be used. Furthermore, the transmission may be a multi-stage transmission having plural shift stages where gear ratios differ from each other.

The invention claimed is:

1. A control apparatus which is applied to a vehicle,
the vehicle having an internal combustion engine and a variable inertia flywheel being provided on an output shaft of the internal combustion engine,
the variable inertia flywheel having: a first inertial body which rotates with the output shaft integrally; a second inertial body physically different from the first inertial body; and an electromagnetic coil, and
being allowed to change a moment of inertia by connecting the first inertial body and the second inertial body by using electromagnetic force which is generated when a current is supplied to the electromagnetic coil, wherein
the control apparatus controls the internal combustion engine and the variable inertia flywheel, and
the control apparatus is programmed so as to include control programming instructions to decrease the current supplied to the electromagnetic coil while controlling the internal combustion engine so that a torque of the internal combustion engine is reduced while power to be output from the internal combustion engine is maintained, in a case that temperature of the electromagnetic coil is higher than a predetermined determination temperature when: the internal combustion engine is being operated; and the first inertial body and the second inertial body are being connected by the current supplied to the electromagnetic coil.

2. The control apparatus according to claim 1, wherein
the control programming instructions are constructed to:
first reduce the torque of the internal combustion engine while maintaining the power output from the internal combustion engine; next set an amount of decrease of supply current to the electromagnetic coil based on an amount of reduction of the torque of the internal combustion engine; and then decrease the supply current to the electromagnetic coil by the amount of decrease which has been set, in a case that the temperature of the electromagnetic coil is higher than the determination temperature when: the internal combustion engine is being operated; and the first inertial body and the second inertial body are being connected by the current supplied to the electromagnetic coil.

3. The control apparatus according to claim 1, wherein
an upper limit determination temperature which is higher than the determination temperature is set, and
the control programming instructions include coil protection programming instructions that are constructed to:
set the amount of decrease of the supply current to the electromagnetic coil based on the temperature of the electromagnetic coil; and then decrease the supply current to the electromagnetic coil by the amount of decrease which has been set, when the temperature of the electromagnetic coil is higher than the upper limit determination temperature.

4. The control apparatus according to claim 3, wherein
the coil protection programming instructions are constructed to make larger the amount of decrease of the supply current to the electromagnetic coil as the temperature of the electromagnetic coil increases.

* * * * *